(12) United States Patent
Huang (10) Patent No.: US 7,881,606 B2
(45) Date of Patent: Feb. 1, 2011

(54) SPLIT MECHANISM FOR A COAXIAL PHOTOGRAPHING DEVICE

(76) Inventor: I-Hsin Huang, P.O. Box No. 6-57, Junghe, Taipei 235 (TW)

( * ) Notice: Subject to any disclaimer, the term of this patent is extended or adjusted under 35 U.S.C. 154(b) by 387 days.

(21) Appl. No.: 12/123,128

(22) Filed: May 19, 2008

(65) Prior Publication Data

US 2009/0196594 A1    Aug. 6, 2009

(51) Int. Cl.
  *G03B 17/04*    (2006.01)
  *G03B 17/02*    (2006.01)

(52) U.S. Cl. .................. 396/541; 396/155; 396/535; 396/373; 396/374

(58) Field of Classification Search ............ 396/541; D16/203, 211
See application file for complete search history.

(56) References Cited

U.S. PATENT DOCUMENTS

| | | | | |
|---|---|---|---|---|
| 5,966,176 | A * | 10/1999 | Chow et al. | 348/373 |
| 6,618,092 | B2 * | 9/2003 | Alessio et al. | 348/373 |
| 7,649,696 | B2 * | 1/2010 | Finizio et al. | 359/703 |
| 2006/0077285 | A1 * | 4/2006 | Cheng | 348/373 |
| 2008/0266393 | A1 * | 10/2008 | Park | 348/143 |

* cited by examiner

*Primary Examiner*—W. B. Perkey
*Assistant Examiner*—Bret Adams
(74) *Attorney, Agent, or Firm*—Muncy, Geissler, Olds & Lowe, PLLC (57) ABSTRACT

A split mechanism for a coaxial photographing device, especially a split mechanism between a photographing unit and a light projection unit of a photographing device used for a full-time surveillance to facilitate an image adjustment or maintenance, uses primarily the photographing unit as a base of support, with the removable light projection unit being assembled coaxially at an image taking end. After the light projection unit is disassembled and changes a position, it can be linked at a constant direction temporarily and can keep operating by using a linking device which is split linearly, such that a calibration light wave needed for adjusting the images can be provided, and the light projection unit can be easily aligned with an axis to be assembled at position upon assembling.

16 Claims, 8 Drawing Sheets

SPLIT MECHANISM FOR A COAXIAL PHOTOGRAPHING DEVICE

BACKGROUND OF THE INVENTION a) Field of the Invention

The present invention relates to a split mechanism for a coaxial photographing device, and more particular to a split, assembly and disassembly mechanism between a photographing unit and a light projection unit of a photographing device used for a full-time surveillance.

b) Description of the Prior Art

A coaxial photographing device is used in a surveillance system, wherein an auxiliary light source is provided in a night projection to serve as a photographing device for a full-time surveillance, with an optic axis along which images are coming into the device same as an optic axis along which light is projecting.

Figure 9:
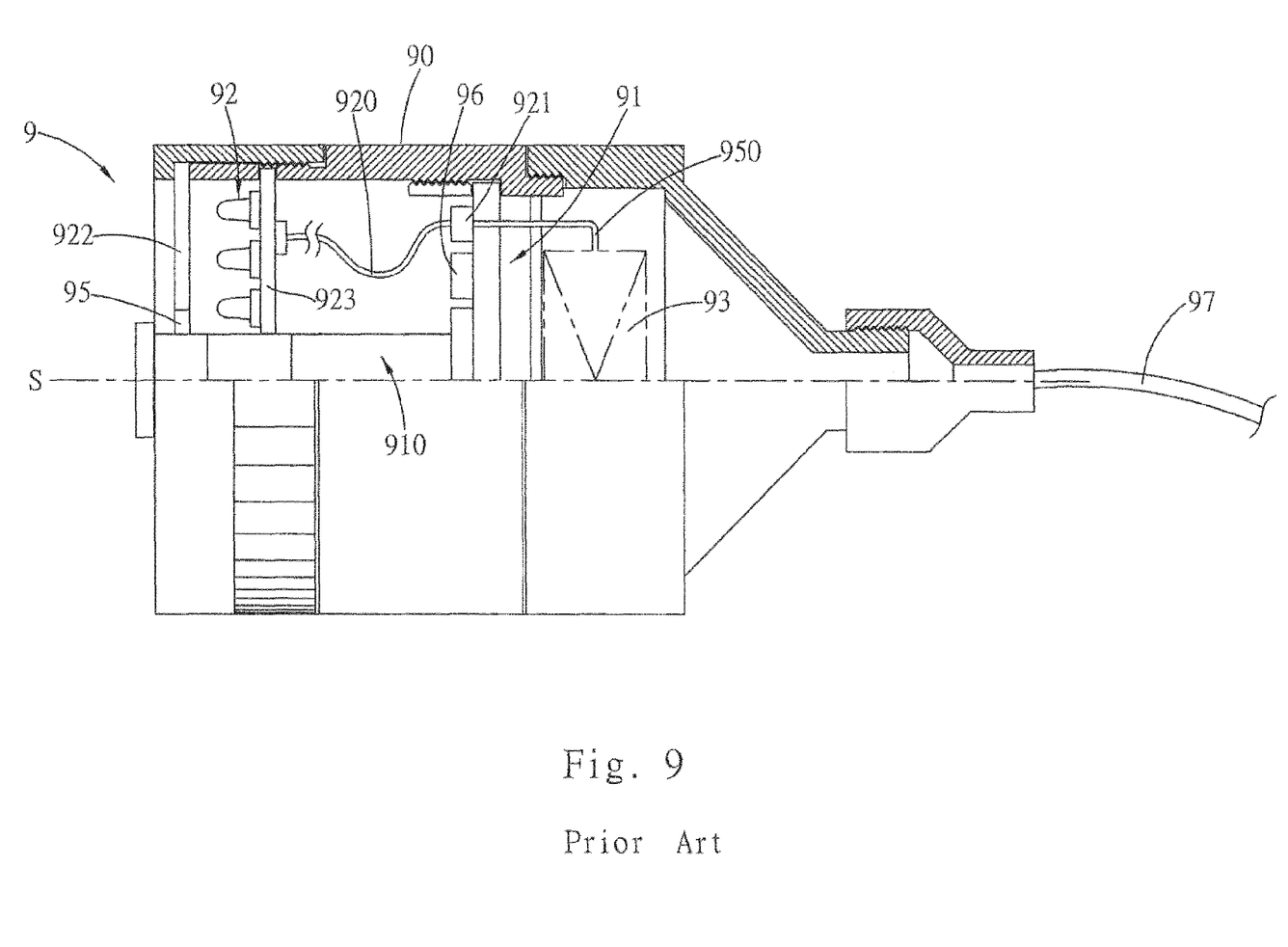
FIG. 9 shows a structure test diagram of a conventional photographing device.

Referring to FIG. 9, a photographing device 9 includes primarily a light projection module 92 which is coaxially attached with a photographing module 91 with a same optic axis S, wherein lens 910 is transfixed through a central through-hole 95 of the light projection module 92 to be attached coaxially. For the conventional photographing device 9, the photographing module 91 is coaxially attached with the light projection module 92 and is enclosed by a serially connected housing 90, with an end being connected to an electric wire 97 which provides an electronic driving device 93 with operating power and signal transmission. The electronic driving device 93 is connected to a lead wire 950, an end of which is linked to a pull terminal 921, with the light projection module 92 being provided with the operating power through an electric wire 920

An exterior of the light projection module 92 is protected by a lens 922, and the light projection module 92 is serial LED dices which are arranged on a surface of a circuit board 923 The circuit board 923 is also provided with a through-hole for transfixing the lens 910, and the photographing module 91 is provided at a rear end in an interior of the serially connected housing 90, with a front end of the photographing module 91 being coaxially assembled with the light projection module 92.

As the photographing device 9 is used full-time, images should be adjusted on-site before using. In addition, as the photographing device 9 is put up in high sky to look down on a ground, implementation personnel should climb high to adjust.

In order to adjust the photographing module 91 for acquiring the correct images, optic parameters should be adjusted through an adjustment key 96 according to an optic condition of the site. If the photographing device operates in daylight environment, then only a value of sensitivity or focus required for the images in the daylight environment can be acquired through the adjustment with the adjustment key 96. However, the adjustment value is not in compliance with a nighttime auxiliary light source, as in particular, invisible infrared is emitted by the light projection module 92 at the nighttime to prevent to visible light from affecting people, events and objects. Therefore, the image adjustment value of the photographing device 91 is based on the daylight condition, and when at the nighttime that only the infrared is emitted, the images will be distorted or blurred from various conditions due to difference in wavelength. On the other hands if the infrared is used as a calibration base for adjustment, then the photographing device can be applied in the daylight. Accordingly, in principle, the wavelength of the infrared should be used as the calibration base for the operation of the photographing module 91.

For the calibration with the infrared, the adjustment should be implemented at dark, and hence, the auxiliary light should be needed to maintain the operation, and the optic axis should be at least parallel to or project in a same direction to an area of photographing.

As the conventional design is an assembly of a single unit, when the adjustment key 96 of the photographing device 91 needs to be adjusted, the light projection module 92 should be disassembled, and the electric wire 920 should be unplugged from the pull terminal 921 therefore the light projection module 92 is separated but is also scattered. During this time, other extension wire will be used to transmit the power of the pull terminal to the light projection module 92 as illumination energy.

As the light projection module 92 is scattered after being disassembled, the optic axis should be held by another hand of an adjustment person or by a second person, allowing a light beam of the light projection module 92 to irradiate to the required photographing area, such that after that photographing area has been irradiated by the infrared, the optic parameters of the adjustment key 96 can be adjusted.

The conventional photographing device is provided with following shortcomings:
1. As the light projection module will be scattered after being disassembled by the high sky operation, it will result in a danger.
2. As two adjustment persons are usually required to operate at a same time, a manpower loading and a danger of high sky cooperation will be increased.
3. Upon reassembling after adjustment, a rim of the through-hole of the light projection module will hit the lens, which may allow the lens to be shifted or damaged.
4. If the exterior of the device is further protected by a protection lens, then an interior surface of the protection lens will reflect a scattered wave of the infrared to enter into the lens, thereby affecting the photographing condition of the lens.
5. When adjusting, as the auxiliary light is held by a bare hand, a swinging will be resulted. If the object to be photographed is there-dimensional, then reflection brilliance is at a left, right, upper or lower side of the object will be changed due to the swinging, allowing the adjustment work to be lengthy and repetitive, which is one of major obstacles in the adjustment operation. Therefore, the adjustment work will take a substantial percentage in installation cost.

SUMMARY OF THE INVENTION

The primary object of the present invention is to provide a split mechanism for a coaxial photographing device which facilitates calibration and maintenance, wherein an axial straight splitting can be formed between a photographing unit and a light projection unit, through a linking device that operates linearly. After splitting, the light projection unit can be offset from the axis, keep at a mechanical connection with the photographing unit, and maintain a full operation. In addition the light projection unit can emit a light beam which is parallel to an image wave of the photographing unit, to provide an image adjustment operation aided by an infrared of a same orientation.

A second object of the present invention is to provide a split mechanism for a coaxial photographing device, wherein upon splitting, the light projection unit and the photographing unit can be safely abutted through a head-on device; or upon disassembling, the light projection unit will not hit the lens through guiding and sectioning of the head-on device.

A third object of the present invention is to provide a split mechanism for a coaxial photographing device, wherein upon disassembling the light projection unit, it will not result in the danger when the light projection unit is scattered.

A fourth object of the present invention is to provide split a mechanism for a coaxial photographing device, wherein the light projection unit is fully disassembled to yield an operational space, so as to facilitate exchanging the lens.

A fifth object of the present invention is to provide a split mechanism for a coaxial photographing device, wherein an outer end of the lens can be formed with an optophysical protection tube to prevent an unnecessary light wave from-n interfering with computation of an automatic shutter, and to form a back pressure function for preventing dust from staining on an optic surface.

A sixth object of the present invention is to provide a split mechanism for a coaxial photographing device, wherein the light projection unit is provided with a directional heat dissipation device, so as to dissipate waste heat rapidly.

A seventh object of the present invention is to provide a split mechanism for a coaxial photographing device, wherein the light projection unit and the photographing unit are locked by an annular locking element that a water-proofing function is provided and the photographing device can be further sealed effectively to be used in water.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
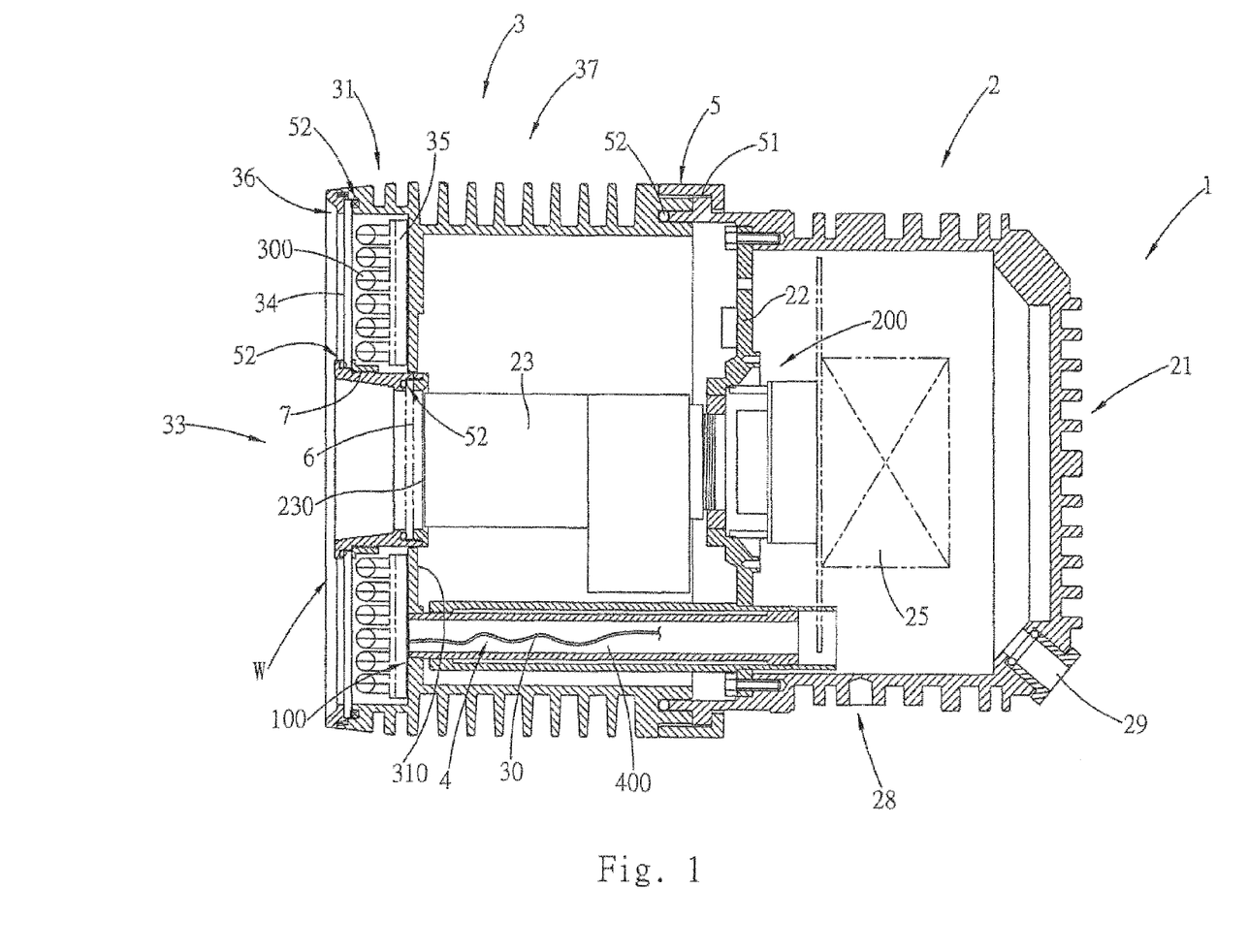
FIG. 1 shows a cutaway view of a split mechanism for a coaxial photographing device after being assembled.

Referring to FIG. 1, a photographing device 1 is constituted primarily by a photographing unit 2 which is coaxially assembled with a light projection unit 3 (the definition of co-axis is that an axis of an image wave is overlapped with an axis of a light beam emitted from the light projection unit 3).

The photographing unit 2 is enclosed by a cup-shape housing 21, an interior of which is installed with a photographing module 200 that is linked indirectly with the cup-shape housing 21 through a substrate 22, and is provided with an electronic driving device 25 that instructs an electric operation of the photographing module 200 and a light emitting module 300. The electronic driving device 25 conducts electricity and a two-way signal through a cable from a connection hole 29, and an exterior is provided with a linking par 28 which is assembled on a bracket (not shown in the drawing) by any fixing method.

The light projection unit 3 is assembled by a cylindrical housing 31, with an operation end providing an assembly for the light emitting module 300 through a bottom plate 310. The light emitting module 300 is constituted by a serial-type LED, the photographing unit 2 is assembled and disassembled with the light projection unit 3 using a locking element 5, and a linking device 4 which operates linearly is provided between the photographing unit 2 and the light projection unit 3, in parallel with an optic axis. The linking device 4 can operate retractably and a lens 23 of the photographing module 200 conducts out an image wave through an optic through-hole 33 opened at a breadth center of the light emitting module 300.

Figure 2:
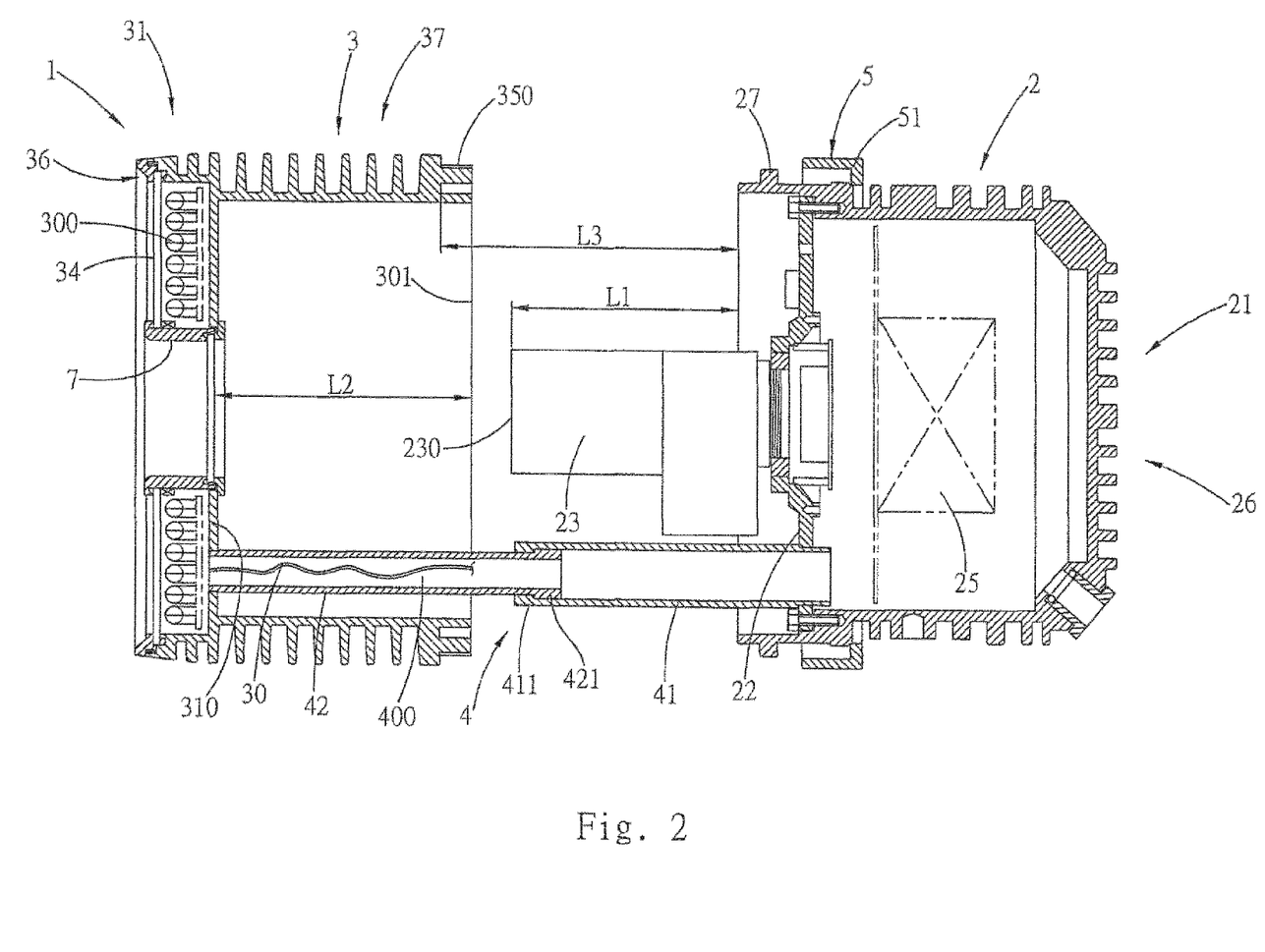
FIG. 2 shows a schematic view of split mechanism for a coaxial photographing device after being split.

Referring to FIG. 2, an axial splitting can be formed between the photographing unit 2 and the light projection unit 3 of the photographing device 1, through the linear operation of the linking device 4 which is transfixed straightly to a guiding element 41 by a shuttle element 42. The guiding element 41 and the shuttle element 42 are sheathed together in a tube shape, with an interior of the tube being formed as a loop 400 for transfixing an electric wire 30 which conducts electricity between the light projection unit 3 and the electronic driving device 25.

Figure 3:
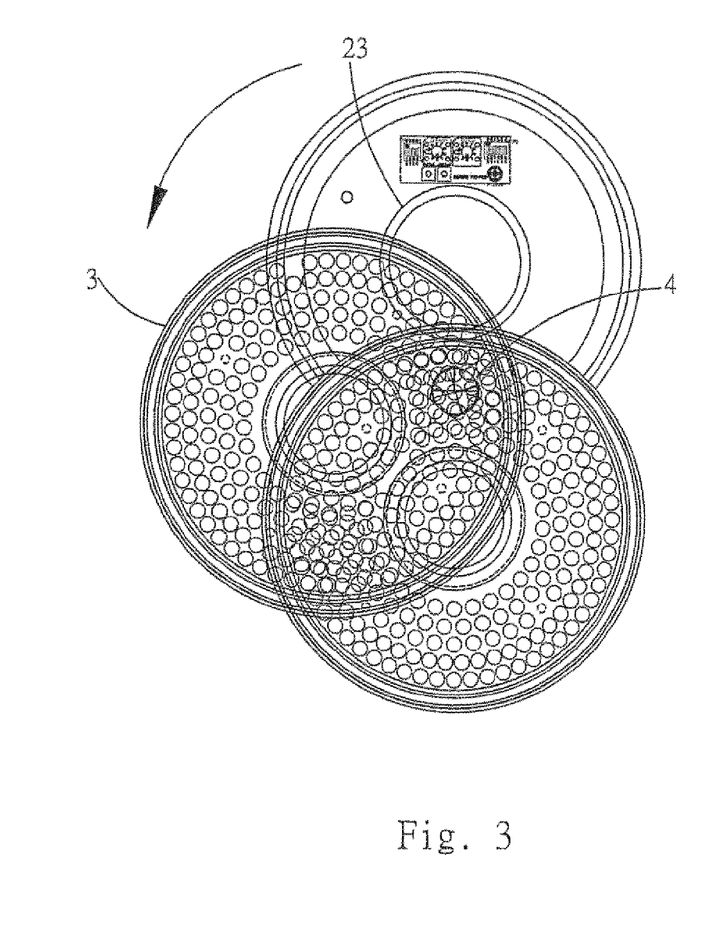
FIG. 3 shows a front view of a split mechanism for a coaxial photographing device wherein a position is changed after a light projection unit has been split.
Figure 4:
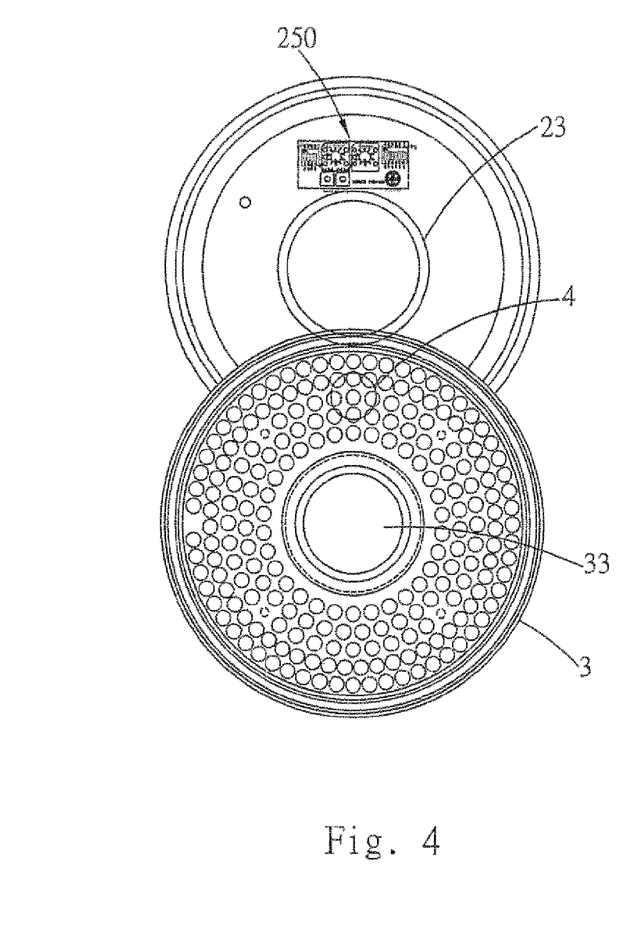
FIG. 4 shows a front view of a split mechanist for a coaxial photographing device wherein a position of a light projection unit is changed, after the split mechanism has been split.
Figure 5:
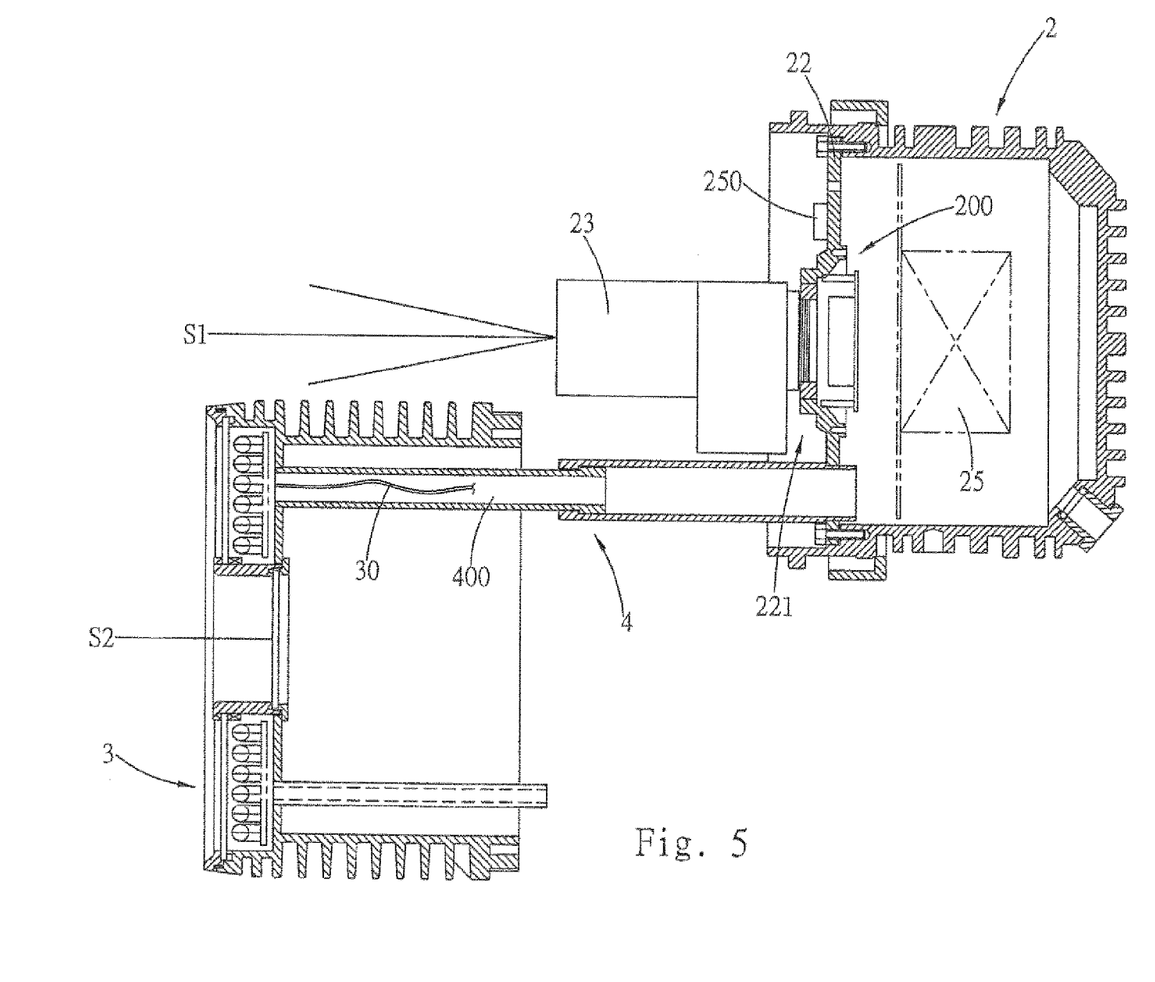
FIG. 5 shows a side view of a split mechanism for a coaxial photographing device wherein a position is changed after the split mechanism has been disassembled.

A split length of the linking device 4 is L3 and that length L3 should meet with a protruded length L1 of the lens 23 out of the cup-shape housing 21. If the linking device 4 is a tube, then it will rotate against its center line. Therefore, as shown in FIG. 3 and FIG. 4, the light projection unit 3 will rotate against the center line of the linking device 4, and will be exposed out of the lens 23 after rotating. In addition, the light projection unit 3 will keep connecting to illuminate by the electric wire 30 (as shown in FIG. 5), and an adjustment key 250 will be exposed by a change of position of the light projection unit 3, such that the adjustment can be performed in an infrared site. On the other hand, upon assembling, the light projection unit 3 will rotate reversely, and the optic through-hole 33 of the light projection unit 3 can keep aligning with the axis of the lens 23 for joining.

Referring to FIG. 2, the light projection unit 3 is enclosed by the cylindrical housing 31, and interior of which is formed with a receiving length L2 which should be larger than the protruded length L1 of the lens 23. Accordingly, during a splitting process, when the light projection unit 3 rotates against the linking device 4, a port 301 of the light projection unit 3 will not hit the lens 23.

A limiting point where the linking device 4 can be pulled out is positioned by limiting elements 411, 421 provided by the shuttle element 42 and the guiding element 41. An end of the guiding element 41 is assembled at the substrate 22 of the photographing unit 2, and an end of the shuttle element 42 is assembled at the bottom plate 310 of the light projection unit 3 such that by the retractable linking, the light projection unit 3 can keep connecting to the photographing unit 2 mechanically through the linking device 4, after splitting the light projection unit 3.

Referring to FIG. 5, the light projection unit 3 is linked through the linking device 4 using the photographing unit 2 as a base of support. As shown in the drawing, after splitting, the light projection unit 3 drops down from a position change. and the electric wire 30 provided by the light projection unit 3 passes through the loop 400 of the linking device 4 and energizes the electronic driving device 25. Therefore, the light projection unit 3 acquires the driving electricity to emit the light beam after being disassembled, with the optic axis S2 being parallel with the optic axis S1 due to the linking device 4, and a projection surface being perpendicular to the linking device 4 Upon adjusting, as the light projection unit 3 operates synchronously and an optic axis of resulted infrared is parallel with the light projection unit 3, a necessary adjustment of a light wave in a same orientation and a calibration wave can be obtained at a same time, with the adjustment operation being conducted by the adjustment key 250 of the photographing nodule 200.

Figure 6:
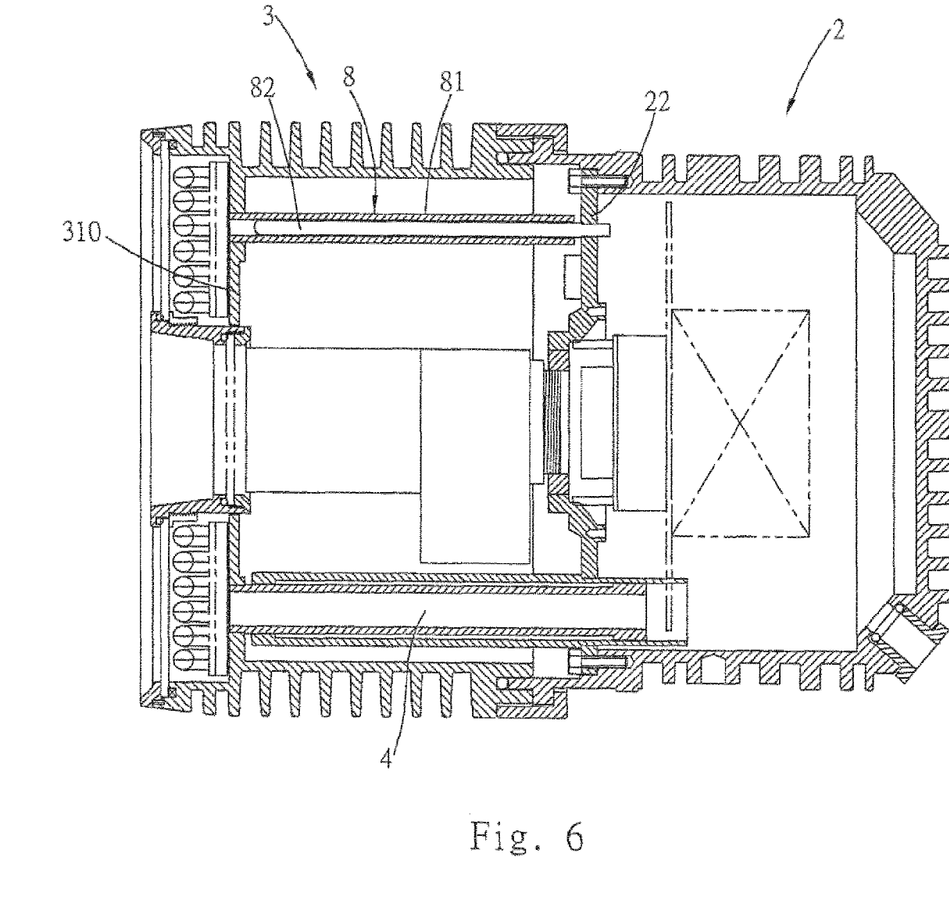
FIG. 6 shows a schematic view of implementing a head-on device of a split mechanism for a coaxial photographing device.

Referring to FIG. 6, a head-on device 8 is further provided at a side parallel to the linking device 4 and the head-on device 8, similar to the linking device 4, is provided with a head-on pillar 81 and a head-on through-tube 82. The head-on pillar 81 and the head-on through-tube 82 are linked respectively to the substrate 22 of the photographing unit 2 and the bottom plate 310 of the light projection unit 3, and are stretched coaxially in a straight line.

Figure 7:
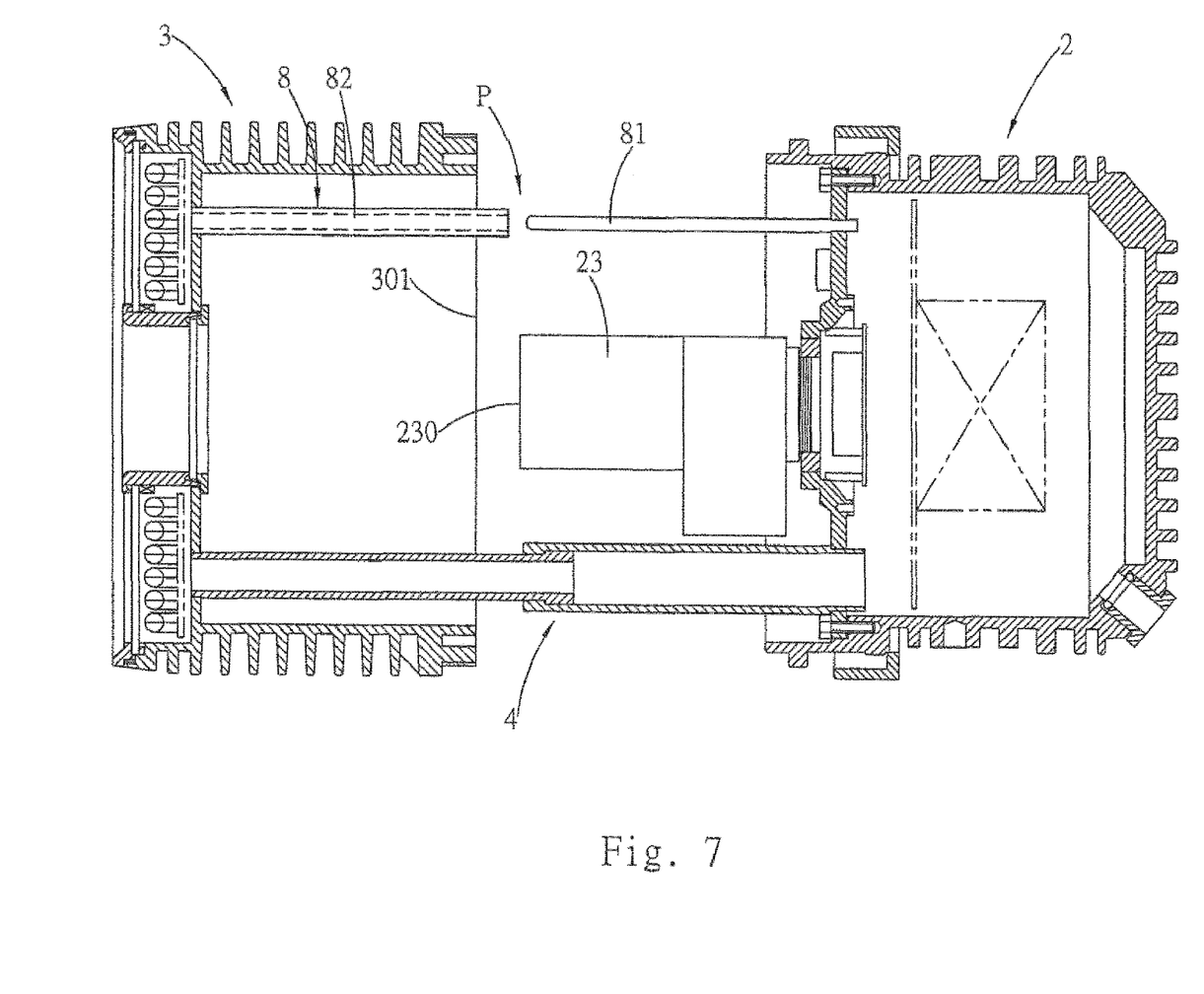
FIG. 7 shows a schematic view of FIG. 6, wherein parts have been split.

Referring to FIG. 7, the linking device 4 is used as a base of splitting, enabling the light projection unit 3 to split with the photographing unit 2. The head-on device 8 can have two functions; a first one is to keep the port 301 of the light projection unit 3 from hitting the lens 23 while splitting and before deflecting and changing position, and a second one is to prevent from any mechanical interference to the lens 23 while abutting and pushing the light projection unit 3 by precisely aligning the head-on device 8 with the axis of the light projection unit 3, upon assembling.

A length of the head-on pillar 81 is a little longer than the protruded length of the lens 23, and a length of the head-on through-tube 82 matches a length of the head-on pillar 81. Therefore, after splitting the linking device 4, a separation point P of the head-on through-tube 82 and the head-on pillar 81 will cross over an) end surface 230 of the tens 23. Accordingly, during the process that the position of the light projection unit 3 is changed axially, the port 301 of the tight projection unit 3 will not hit the lens 23, to keep safety of the lens 23.

Figure 8:
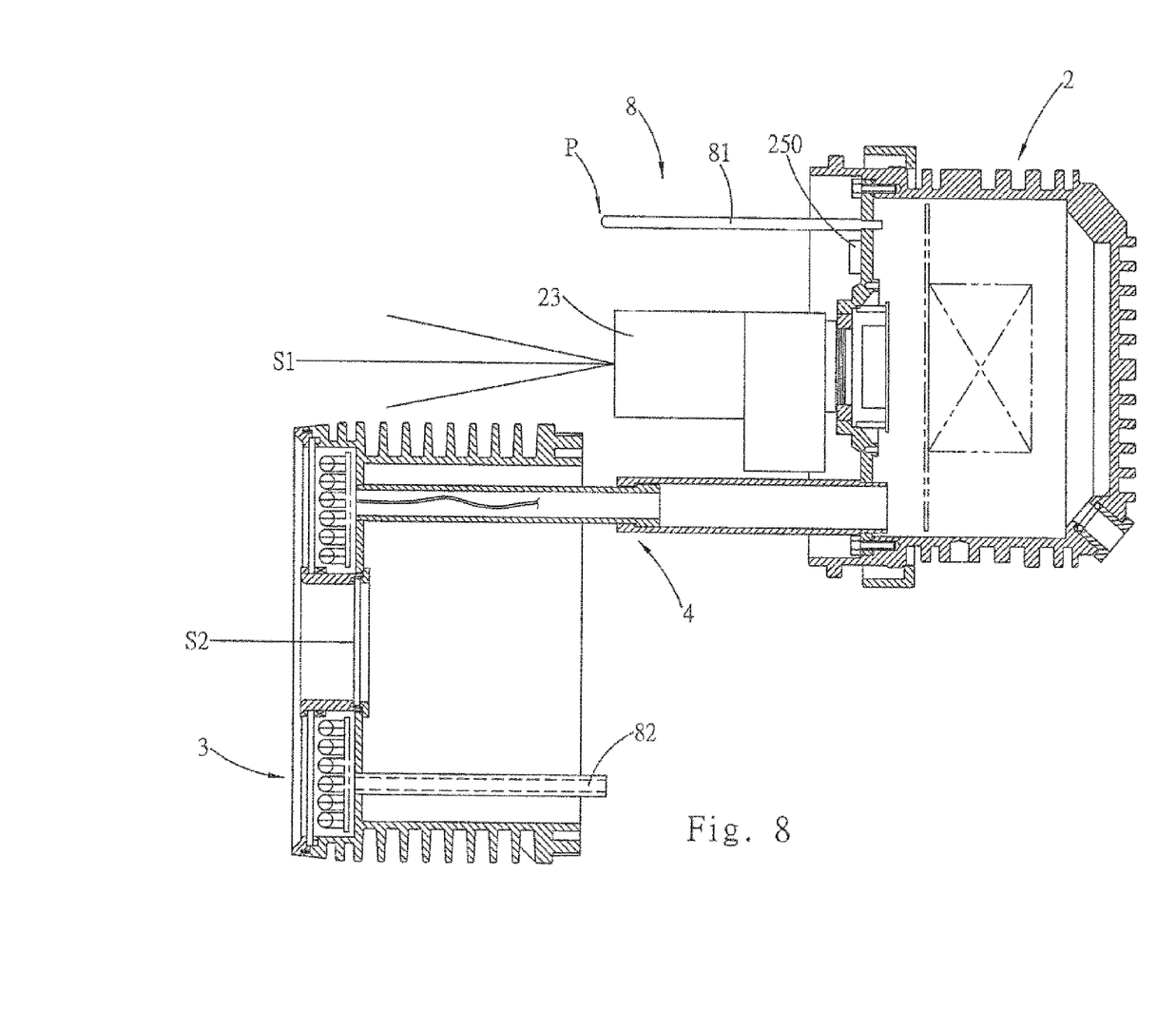
FIG. 8 shows a schematic view of FIG. 7 after a position of a light projection unit has been changed, when the split mechanism is disassembled.

Referring to FIG. 8, when a port of the head-on through-tube 82 of the head-on device 8 is escaped from the separation point P, the light projection unit 3 will deflect with the linking device 4 as a center; at that time the position of light projection unit 3 with be changed downward and the light projection unit 3 will keep illuminating simultaneously. At this time, the optic axis S2 is parallel with the optic axis S1 of the lens 23, an irradiation surface of the light projection unit 3 can be roughly overlapped with an image area of the lens 23, and the adjustment key 250 will be exposed for adjustment. Therefore, the light wave for adjustment will be the infrared and is provided with the same orientation that the adjustment base of a certain lumen and calibration is acquired.

Referring to FIG. 1, the light projection unit 3 is the serial-type light emitting module 300 which is supported by the circuit board 35 and is linked on the bottom plate 310 of the cylindrical housing 31, with an outer end being maintained by a protection lens 34. Waste heat generated by the light emitting module 300 can be conducted toward the cylindrical housing 34 through the bottom plate 310, and the housing 31 is provided with a longitudinal length with a surface being distributed with cooling fins 37. Therefore, the waste heat generated by the light emitting module 300 is conducted to the cooling fins 37 through the bottom plate 310, such that the heat can be dissipated in a large area. The light emitting module 300 is made by LED dices, and thus, the waste heat will be generated from electrode pins (not shown in the drawing) of the dices. At a side of the circuit board 35, opposite to the electrode pins, thermal conductive adhesive 100 can be introduced into a gap between the circuit board 35 and the bottom plate 310 by paving or coating, so as to form a directional heat dissipation.

A center of the light projection unit 3 is provided with the optic is through-hole 33, a center point of which is overlapped with an axis of the lens 23, and which can be surrounded by a protection tube 7. The protection tube 7 blocks an inner circumferential surface of the optic through-hole 33, an enclosed shape is formed by the surrounding of the bottom plate 310, the cylindrical housing 31 and the protection lens 34 to protect the light emitting module 300 without being contaminated by external dust. The protection lens 34 is locked through pressing of a tightening ring 36, so as to seal the end surfaces of the protection lens 34 and the cylindrical housing 31 In addition, the protection tube 7 can also form a sealing effect between the protection lens 34 and the bottom plate 310, to effectively enclose the light emitting module 300. The electric wire 30 of the light emitting module 300 energizes the electronic driving device 25 through the trans-fixing of the hollow loop 400 of the linking device 4, and after being sealed, the light emitting module 300 provides the light projection unit 3 with the independent sealing and enclosing, whether being assembled or disassembled.

A bottom of the protection tube 7 can be provided additionally with an optic lens 6 which provides an internal space of the entire device to be sealed completely after assembling the light projection unit 3 and the photographing unit 2, enabling an interior of the photographing device 1 to have effects of water-proofing and dust-proofing.

The optic lens 6 is attached on the end surface 230 of the lens 23, hence a light wave coming into the lens 23 will be closest to the optic lens 6, to prevent a reflection wave on an inner surface of the optic lens 6 from affecting the optic condition for taking the images. On the other hand, an inner space formed by the protection tube 7 and the optic lens 6 will be provided with a back pressure function, preventing the dust which is drifting outside from entering easily to stain a line of vision of the lens 23.

The protection tube 7 is provided with a longitudinal length to block an unnecessary slant light wave W with respect to the lens 23 without affecting a sensitizing operation of the lens 23. The unnecessary light wave W is generated from a slant traveling light of a car or a slant light of sunset, and is not a light wave of a target of photographing. If the unnecessary light wave enters, then a computation value of an automatic aperture or automatic shutter will be affected to result in a distortion of the image. In principle, the actual image wave for photographing as required by the lens 23 is the light wave of the image area, and other slant light waves are not needed. Therefore, by using the length of the protection tube 7, the slant light wave can be blocked from entering into the lens 23.

A pulling assembly is formed between the photographing unit 2 and the light projection unit 3 through the locking element 5. Referring to FIG. 2, it shows an implementation of the locking element 5, wherein an opposite end of the light projection unit 3 is provided with a thread 350, and an opposite end of the photographing unit 2 is provided with a pressing part 27. If the locking element 5 is an annular-shape locking ring 51, with an end being slidingly cutting an opposite surface of the pressing part 27, and an inner surface being locked with the thread 350, then the photographing unit 2 and the tight projection unit 3 can be locked and joined by rotating, through the locking operation of the locking ring 51. The locking and joining by rotating can provide for a bare hand operation at an outer rim of the locking ring 51, without requiring an assistance of other tools.

For a gap of each aforementioned assembly of elements, such as the light emitting module 300 of the light projection unit 3, the protection lens 34 is locked by the tightening ring 36; and then a circumference of the protection lens 34 facing the cylindrical housing 31 is sheathed with an ordinary elastic leak-proof O-ring 52 (as shown in FIG. 1) to form a sealing effect by the elastic reaction force upon being compressed, thereby providing the photographing device 1 to be used in a high-pressure condition, such as deep water.

Referring to FIG. 5, the lens 23 is assembled by rotating through the substrate 22 or the assembly part 221 of the photographing module 200. When the light projection unit 3 changes a position to yield, an operational room will be resulted, and the lens 23 will be exposed. Therefore by the bare hand operation, the lens 23 can be assembled or disassembled through the assembly part 221, thus allowing the lens of a different condition to be exchanged easily.

Referring to FIG. 2, the waste heat resulted from the electronic driving device 25 of the photographing unit 2 is distributed to the cup-shape housing 21 by radiation or the implementation of the thermal conductive adhesive 100, and the outer side of the cup-shape housing 21 can be formed with the cooling fins 26 to enlarge the heat dissipation area. As the outer sides of the photographing unit 2 and the light projection unit 3 are all provided with the cooling fins 26, 37, by a concavo-convex shape of the fins, an intensity of the housing can be enhanced, so as to facilitate using in the high-pressure condition. Certainly, the exposed protection lens 34 also needs a capability to sustain with the high pressure.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A split mechanism for a coaxial photographing device, especially a split mechanism between a light projection unit and a photographing unit of a photographing device used in a surveillance system, comprising:

a photographing unit, which is enclosed by a semi-opened cup-shape housing having an opening on one side, with the side of the opening being assembled with a photographing module through a wall, and an outer surface;

a light projection unit, which is enclosed by a cylindrical housing, and a first end surface at a projection end which is provided with a light emitting module, with a center of the first end surface being provided with an optic through-hole, a second end surface of the cylindrical housing being tightly connected at the opening of the photographing unit, an electric wire conducting electricity between an electronic driving device and the light projection unit;

the electronic driving device being provided in an interior of the photographing unit to operate the photographing module and the light emitting module; and a linking device, which is parallel to an optic axis of a lens of the photographing module and is stretched linearly, two ends of which are connected respectively with the photographing unit and the light projection unit, and which further includes a linear shuttle element slidingly connected with a linear guiding element, with limiting elements being provided between a free end of the shuttle element and a free end of the guiding element to limit how far the light projection unit is extended from the photographing unit.

2. The split mechanism for a coaxial photographing device according to claim 1, wherein the shuttle element and the guiding element of the linking device are sheathed together in a tube shape.

3. The split mechanism for a coaxial photographing device according to claim 1, wherein a head on device which is linearly stretched and separated is provided between the photographing unit and the light projection unit, parallel to a side of the linking device, with front and rear ends of the head-on device being joined respectively with the light projection unit and the photographing unit.

4. The split mechanism for a coaxial photographing device according to claim 3, wherein the head-on device is formed by a head-on pillar which is transfixed with a head-on through-tube.

5. The split mechanism for a coaxial photographing device according to claim 4, wherein an end of the head-on pillar is assembled at the photographing unit, an end of the head-on through-tube is assembled at the light projection unit, and the two are linearly stretched and deflected, with a separation point of the deflection escaping and crossing over an end surface of the lens.

6. The split mechanism for a coaxial photographing device according to claim 1, wherein a length of the linking device provides a port of the housing of the light projection unit to escape and cross over the end surface of the lens, after the light projection unit has been disassembled.

7. The split mechanism for a coaxial photographing device according to claim 1, wherein a plurality of sealing positions of the photographing unit and the light projection unit are each locked by a locking element.

8. The split mechanism for a coaxial photographing device according to claim 7, wherein the locking element is a locking ring, with a side being cut and locked at a pressing part of the housing of the photographing unit, and the other side being locked at a thread of the housing of the light projection unit.

9. The split mechanism for a coaxial photographing device according to claim 1, wherein the lens of the photographing unit protrudes out of the port of the housing by a length $L1$, a receiving length inside the light projection unit is $L2$, and a split length of the linking device is $L3$, with $L3>L1$ and $L2 \geq L1$, or, $L3 \geq L2$ and $L2 \geq L1$.

10. The split mechanism for a coaxial photographing device according to claim 1, wherein the electric wire of the light emitting module passes through a loop of the linking device and the light emitting module is energized by the electronic driving device through the electrical wire.

11. The split mechanism for a coaxial photographing device according to claim 1, wherein light emitters of the light projection unit are a plurality of LEDs which are welded on an outer side of a circuit board serially, and an inner side of the circuit board is assembled on a bottom plate connected at the housing, so as to form a directional heat dissipation path.

12. The split mechanism for a coaxial photographing device according to claim 11, wherein thermal conductive adhesive is introduced between the inner side of the circuit board and the bottom plate.

13. The split mechanism for a coaxial photographing device according to claim 1, wherein the light projection unit includes the light emitting module which is enclosed by the bottom plate and a protection lens, and the central optic through-hole is sheathed with a protection tube, forming an enclosing space of the light emitting module by joining with the housing.

14. The split mechanism for a coaxial photographing device according to claim 1, wherein a bottom end of the optic through-hole is provided with another optic lens which is close to an outer end of the lens.

15. The split mechanism for a coaxial photographing device according to claim 14, wherein the optic lens is waterproofed and is sealed at a bottom end of the protection tube.

16. The split mechanism for a coaxial photographing device according to claim 1, wherein the photographing unit is assembled with the photographing module with a substrate, and the lens is assembled or disassembled by an assembly part provided at a related position of the substrate.

* * * * *